(12) United States Patent
Boll

(10) Patent No.: US 6,808,470 B2
(45) Date of Patent: Oct. 26, 2004

(54) MOTOR VEHICLE DRIVE

(75) Inventor: Wolf Boll, Weinstadt (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/305,431

(22) Filed: Nov. 27, 2002

(65) Prior Publication Data
US 2003/0153429 A1 Aug. 14, 2003

(30) Foreign Application Priority Data
Nov. 29, 2001 (DE) .......................... 101 58 536

(51) Int. Cl.$^7$ ............................................ B60K 41/02
(52) U.S. Cl. ............................. 477/6; 477/8; 180/65.2; 180/65.7
(58) Field of Search .................... 477/5, 6, 8; 180/65.1, 180/65.2, 65.6, 65.7

(56) References Cited

U.S. PATENT DOCUMENTS 5,697,466 A * 12/1997 Moroto et al. ............. 180/65.2
6,199,650 B1 * 3/2001 Masberg et al. ............ 180/197
6,223,842 B1 * 5/2001 Masaki ..................... 180/65.2

FOREIGN PATENT DOCUMENTS

| DE | 3542059 C1 | 11/1985 |
| DE | 3828128 A1 | 3/1990 |
| DE | 4004330 C2 | 8/1991 |
| DE | 4005623 A1 | 8/1991 |
| DE | 19639322 A1 | 5/1998 |
| DE | 19905366 C2 | 8/2000 |

* cited by examiner

Primary Examiner—Richard M. Lorence
(74) Attorney, Agent, or Firm—Crowell & Moring LLP

(57) ABSTRACT

A motor vehicle drive includes an electric motor and at least one clutch in the drive line between the electric machine and the driven wheels of a motor vehicle. If the special case occurs in which high torques have to be supplied by the electric motor when the vehicle speed is very low or when the vehicle is stationary, the clutch is operated in a torque-transmitting slipping manner, ensuring that neither the electric machine nor the clutch are thermally overloaded.

17 Claims, 2 Drawing Sheets

MOTOR VEHICLE DRIVE

This application claims the priority of German Patent Document No. 101 58 536.5-32, filed Nov. 29, 2001, the disclosure of which is expressly incorporated by reference herein.

BACKGROUND AND SUMMARY OF THE INVENTION

The invention relates to a motor vehicle drive.

The invention relates to a motor vehicle drive containing at least one electric machine, which can be operated as an electric motor for driving a motor vehicle through a drive line; a clutch device with at least one clutch in the drive line between the electric machine and an output for driving the wheels of the motor vehicle.

DE 40 05 623 A1 discloses a motor vehicle drive, with which a motor vehicle can be driven either by a combustion engine or by an electric motor or by both using a clutch device. This is therefore what is referred to as a hybrid drive. The combustion engine and the electric machine act on the same vehicle wheels.

DE 40 04 330 C2 discloses a hybrid drive for a motor vehicle, in which a combustion engine and an electric machine act on the same drive line and can each be coupled to or decoupled from it. The electric machine can be operated either as a drive motor, as a generator or as an electric starter motor for starting the combustion engine.

DE 35 42 059 C2 shows a hybrid drive in which the combustion engine drives the vehicle wheels on one axle, and an electric machine acting as an electric motor drives the vehicle wheels on another wheel axle.

DE 199 05 366 C2 discloses a hybrid motor vehicle drive in which the crankshaft of a combustion engine can be connected to a gearbox input shaft by an engageable and disengageable clutch and the crankshaft is connected in a rotationally fixed manner to the rotor of an electric machine, which can be operated as an electric starter motor or as a generator.

DE 196 39 322 A1 discloses an automatically controlled clutch in the drive line of a motor vehicle with a gearbox, in which different drive settings or gear ratios can be selected by the driver, with an actuating unit that automatically actuates the clutch, and with a sensor system that is used to control this unit and, inter alia, detects actuation of a vehicle brake by the driver, actuation of a control element of the engine by the driver and a selected condition of a drive setting or gear ratio and sets the clutch to a creeping torque if the vehicle brake and the control element are unactuated with the engine running. To make manoeuvring easier, this document also discloses adjusting the automatic clutch to a low transmissible torque, i.e. to a creeping torque when a gear ratio has been set, the engine is running and neither the service brake of the vehicle nor an accelerator pedal or the like used to control the output of the engine is actuated. Here, use is made of the fact that the engines of motor vehicles generally have an effective automatic engine control system which is capable of keeping the engine at a minimum speed (e.g. idling speed) when the accelerator pedal is unactuated, even if the engine is subject to a greater or smaller load. In this case, the motor vehicle can creep during manoeuvring operations. However, the power flow between the input and output of the clutch is interrupted completely when the service brake is actuated, making it necessary to adjust the clutch back to the creeping torque at the end of brake actuation. To avoid this, the document proposes that, if the vehicle brake remains actuated, the clutch set to a creeping torque is only opened after a predetermined delay and/or that the creeping torque is reduced slowly in the case of brake actuation and/or that a reduced clutch torque compared with the creeping torque is set if the vehicle brake is being actuated.

In the case of motor vehicles that have only one or more electric motors as traction drives and in the case of motor vehicles which have an electric motor as a traction drive motor in addition to a combustion engine, the electric motor is often subject to driving situations in which it has to supply high torques when the speed is very low or when the motor vehicle is stationary, e.g. when driving onto a curb, when climbing out of an underground garage, when creeping forwards with a trailer on a hill etc.

In these situations, large heat losses occur both in the at least one electric machine, which is used as an electric motor for the traction drive, and in its power semiconductors, which are nowadays used for such electric machines. While these heat losses are uniformly distributed in the rotor and/or the semiconductors of the electric machine during normal driving of the motor vehicle, the heat builds up in the windings instantaneously supplied with current and in the associated semiconductors of the electric machine when the motor vehicle is stationary or creeping slowly.

As a result, the permitted continuous holding torques of the electric machine are in some cases reduced considerably, depending on design.

This calls into question the utility of the electric drive. Overdimensioning of the electric machine for the required continuous static torque is not desirable for reasons of cost and weight.

It is an object of the invention to obtain the required continuous static torque of the electric machine in the special operating case, in which high traction drive torques have to be supplied at a very low motor vehicle speed or when the motor vehicle is stationary without the need to overdimension the electric machine.

According to the invention, this object is achieved by a control device, with which the at least one clutch can be operated in a torque-transmitting slipping manner to avoid thermal overloading both of the clutch of the clutch device and of the electric machine in the special operating case. In the special operating case, increased waste heat arises in the electric machine compared with normal operation when the speed is very low or the motor vehicle is stationary and the torque of the electric machine is simultaneously high.

The invention thus solves the problem by placing in the drive line between the at least one electric machine and the driven wheels at least one clutch, which is operated in a slowly slipping manner in the abovementioned special operating case, ensuring that neither the electric machine nor the clutch is thermally overloaded. The advantage is that the evolution of heat in the electric machine is distributed uniformly and with sufficiently rapid alternation between all the coils and semi-conductors, with the result that temperature peaks are avoided and the electric motor can supply a high continuous static torque over longer periods.

If the motor vehicle drive contains an automatic transmission with selectable gear ratios, a preferred embodiment of the invention can include the automatic transmission or at least one clutch or holding brake used as a clutch device, which can be operated in a torque-transmitting slipping manner by the control device in the way mentioned. The advantage is that there is no need for clutches in addition to the automatic transmission for the invention. To produce the slight slip required, it may be expedient to operate the clutch in a pulsed manner.

In an automatic transmission with an upstream torque converter and a lock-up clutch for locking up the torque converter, it is possible, according to another preferred embodiment, for the lock-up clutch to be used as the clutch of the clutch device, which can be operated in a torque-transmitting slipping manner by the control device in the manner mentioned above. The advantage is that the invention does not require a special clutch. The lock-up clutch can also be operated in a torque-transmitting slipping manner in combination with one or more selector clutches of the automatic transmission, i.e. both can be operated in this way, in the special case mentioned, being operated at alternate times, for example.

The electric machine serving as the traction drive motor is preferably of the type that has at least two individually excitable electric windings. According to the invention, these windings can be excited alternately by the control device in the special operating case, one winding in each case being unexcited and able to cool down while another winding is excited to produce a driving torque. The advantage is that the continuous alternation of excitation between the windings and semiconductors ensures uniform distribution of the electrically generated heat, and overdimensioning of the electric machine for the special operating case is not required; the waste heat in the clutch device is reduced because a low slipping speed is sufficient for uniform distribution of the heat.

In another preferred embodiment of the invention, the clutch device has a plurality of clutches, which can be operated alternately in torque-transmitting slipping mode by the control device to reduce the waste heat peaks in the individual clutches. In addition or as an alternative, the embodiment can be such that the clutches can be operated together (in parallel or in series) by the control device to reduce the waste heat peaks in the individual clutches. The advantage is that, in the special case, the clutches can be operated alternately and/or together, ensuring a reduction in the waste heat peaks and hence lengthening of the service life of the clutch. It is possible also to use clutches that are not designed for prolonged continuous slipping operation with torque transmission.

The invention can be used for motor vehicle drives in which one or more electric machines are provided as electric motors for the traction drive, and can furthermore also be used in combination with a combustion engine as a traction drive. It is possible for the electric motor and the combustion engine to be operated simultaneously or alternately. The combustion engine and the electric machine can be designed to drive the same vehicle wheels or different vehicle wheels. Provision can furthermore be made to use the electric machine as a starter for the combustion engine.

Other objects, advantages and novel features of the present invention will become apparent from the following detailed description of the invention when considered in conjunction with the accompanying drawings.

DETAILED DESCRIPTION OF THE DRAWINGS

Figure 1:
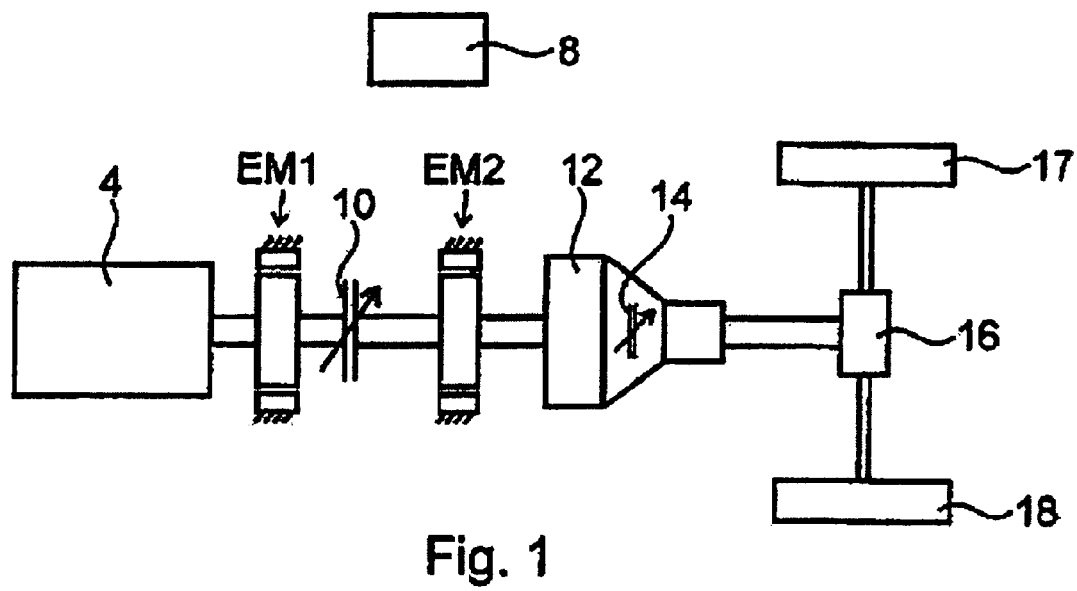
FIG. 1 shows a motor vehicle drive according to the invention schematically in a side view.

FIG. 1 shows a motor vehicle drive with a drive train that has the following elements in series: a combustion engine 4, a first electric machine EM1, which can be operated as an electric motor, a generator and/or a starter, an engageable and disengageable main clutch 10, a second electric machine EM2, which can be operated as an electric motor or a generator, an automatic transmission 12 with a plurality of selector clutches 14 (clutches or gear-change brakes), which can be engaged and disengaged by a control device 8, for selecting various gears, a differential 16 and vehicle wheels 17 and 18. The control device 8 also monitors the operation of the two electric machines EM1 and EM2 and the combustion engine 4, and detects their operating data.

When the main clutch 10 is open, the first electric machine EM1 can serve as a starter for the combustion engine 4 or be driven by the combustion engine and then serve as a generator. The second electric machine EM2 can be used as an electric motor for the traction drive of the motor vehicle or as a braking generator for energy recuperation. When the main clutch 10 is closed, one and/or the other of the two electric machines EM1 and EM2 can serve as an electric motor or as a generator. The selector clutches 14 of the automatic transmission 12 do not need to be designed for continuous slipping operation. However, they can be used as a clutch device according to the invention for the special case if, according to a special embodiment of the invention, they are operated by the control device 8 alternately and/or together in slipping mode with torque transmission in the special case.

Figure 2:
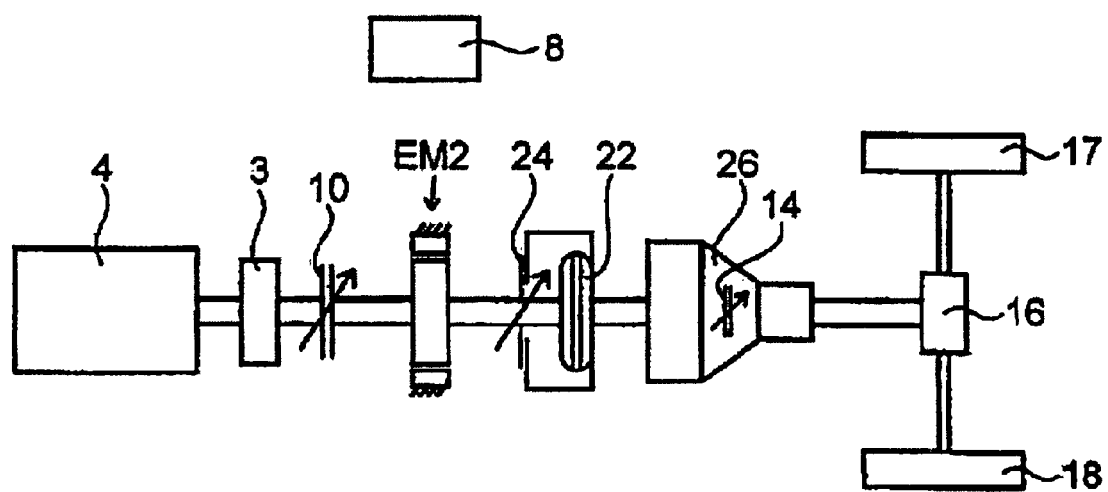
FIG. 2 shows a further embodiment of a motor vehicle drive according to the invention schematically in a side view.

FIG. 2 shows a motor vehicle drive according to the invention with a drive train that contains the following elements in series: a combustion engine 4, a flywheel 3, an engageable and disengageable main clutch 10, an electric machine EM2, a hydrodynamic torque converter 22 with a lock-up clutch 24 that can be controlled by a control device 8, an automatic transmission 26, a differential 16 and vehicle wheels 17 and 18. When the main clutch 10 is closed and when it is open, the electric machine EM2 can act as an electric traction drive to assist the combustion engine 4 or as a generator for the purpose of recovering braking energy. In normal driving operation with the electric motor EM2, the lock-up clutch 24 remains closed. In the above-mentioned special operating case, in which the main clutch 10 is open and the electric machine EM2 drives the motor vehicle as an electric motor, the lock-up clutch 24 is operated in a torque-transmitting manner with little slip by the control device 8.

In all the embodiments according to the invention, especially FIGS. 1 and 2, the temperature of the electric machine EM2 and of the clutches, which are operated with slip in a torque-transmitting manner in the special operating case, can be monitored by temperature sensors in order to operate the at least one clutch with slip in a torque-transmitting manner when a certain temperature is reached and exceeded so as to prevent the temperature in the electric machine from rising above the predetermined value. However, it is also possible instead for the temperature to be calculated from the rotational speeds on the primary side and the secondary side of the clutch and from the torque produced by the electric machine EM2. The data are acquired by the control device 8 and used to control the frictional slip of the clutch. There can be temperature measurement by temperature sensors in addition as a safety precaution.

The invention makes it possible to transfer the clutch 14 or 24 from slip-free operation to slipping operation in the special operating case without reducing the driving torque of the electric motor EM2 and to transmit the full driving torque even during slipping operation.

Figure 3:
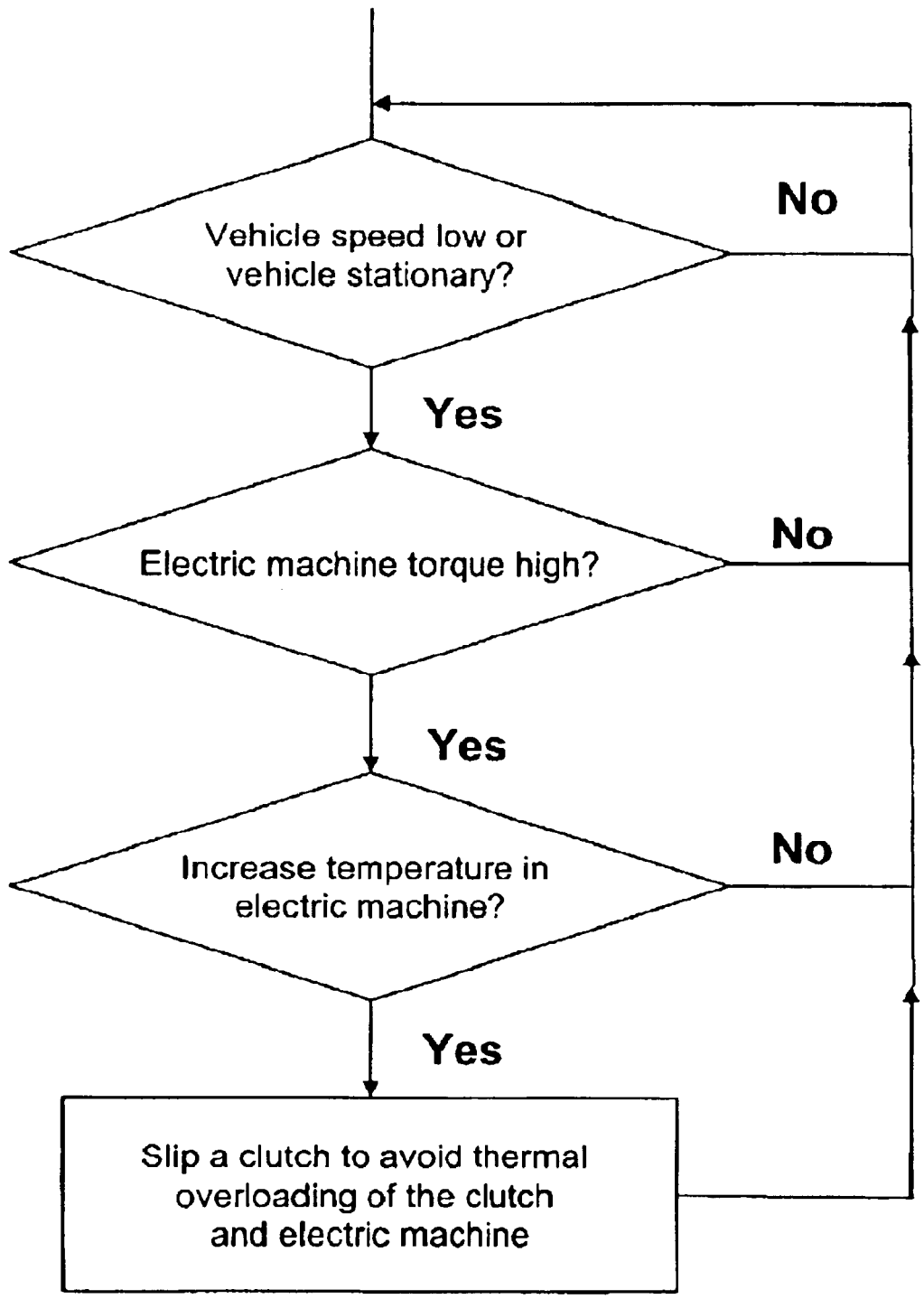
FIG. 3 is a flow chart illustrating an embodiment for the method of operating a motor vehicle.

If an increased temperature in the electric machine EM2 or parts of the latter compared with normal operation occurs when the speed is low or the motor vehicle is stationary and the torque of the electric machine EM2 is simultaneously high, damage is avoided by the device according to the invention. FIG. 3 is a flow chart that illustrates how this is accomplished. The waste heat can distribute itself uniformly between all windings in the special operating case since a situation where one winding of a preferred electric machine EM2 with at least two individually excitable electric windings is excited for too long is prevented.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Motor vehicle drive comprising:
   at least one electric machine;
   a clutch device including at least one clutch in a drive line between the electric machine and an output for driving wheels of the motor vehicle; and
   a control device which controls the clutch in a torque-transmitting slipping manner to avoid thermal overloading both of the clutch and of the electric machine when, compared with normal operation, an increased temperature or increased waste heat arises in the electric machine when the speed is low or the motor vehicle is stationary and the torque of the electric machine is simultaneously high.

2. Motor vehicle drive according to claim 1, wherein the clutch device includes an automatic transmission with automatically operated selector clutches.

3. Motor vehicle drive according to claim 1, wherein the clutch device includes an automatic transmission including an upstream torque converter and a lock-up clutch for locking up the torque converter, and the lock-up clutch includes the at least one clutch.

4. Motor vehicle drive according to claim 1, wherein the electric machine includes at least two individually excitable electric windings, and the control device is able to excite the windings alternately, wherein one windings is unexcited to cool down while the other winding is excited to produce a driving torque, when, compared with normal operation, an increased temperature or increased waste heat arises in the electric machine when the speed is low or the motor vehicle is stationary and the torque of the electric machine is simultaneously high.

5. Motor vehicle drive according to claim 1, wherein the electric machine includes at least two individually excitable electric windings, and in that these windings can be excited alternately by the control device in the special operating case, thus avoiding a situation in which one winding in each case is excited for too long and allowing the waste heat to distribute itself uniformly between all the windings.

6. Motor vehicle drive according to claim 1, wherein the clutch device includes a plurality of clutches, and the clutches are operated alternately in torque-transmitting slipping mode by the control device to reduce the waste heat peaks in the individual clutches.

7. Motor vehicle drive according to claim 1, wherein the clutch device includes a plurality of clutches, and the clutches are operated together by the control device to reduce the waste heat peaks in the individual clutches.

8. Motor vehicle drive according to claim 1, further comprising a combustion engine to produce a driving torque of the motor vehicle.

9. Motor vehicle drive according to claim 1, wherein the at least one clutch is driven in a pulsed slipping manner.

10. Motor vehicle drive according to claim 1, wherein the electric machine includes an electric motor for driving a motor vehicle through a drive line.

11. Method of operating a motor vehicle drive that includes at least one electric machine and a clutch device including at least one clutch in a drive line between the electric machine and an output for driving wheels of the motor vehicle, comprising:
    controlling the at least one clutch of the clutch device in a torque-transmitting slipping manner to avoid thermal overloading both of the clutch and of the electric machine when, compared with normal operation, an increased temperature or increased waste heat arises in the electric machine when the speed is low or the motor vehicle is stationary and the torque of the electric machine is simultaneously high.

12. Method according to claim 11, wherein the clutch device includes an automatic transmission with automatically operated selector clutches.

13. Method according to claim 11, wherein the clutch device includes an automatic transmission including an upstream torque converter and a lock-up clutch for locking up the torque converter, and the lock-up clutch includes the at least one clutch.

14. Method according to claim 11, wherein the clutch device includes a plurality of clutches, the method further comprising operating the clutches alternately in torque-transmitting slipping mode by the control device to reduce the waste heat peaks in the individual clutches.

15. Method according to claim 11, wherein the clutch device includes a plurality of clutches, the method further comprising operating the clutches together to reduce the waste heat peaks in the individual clutches.

16. Method according to claim 11, further comprising applying the at least one clutch in a pulsed slipping manner.

17. Method according to claim 11, wherein the electric machine includes an electric motor for driving a motor vehicle through a drive line.

* * * * *